United States Patent
Linden et al.

(10) Patent No.: US 7,485,485 B2
(45) Date of Patent: Feb. 3, 2009

(54) METHOD AND APPARATUS FOR MAKING A MEMS SCANNER

(75) Inventors: Kelly D. Linden, Lynnwood, WA (US); Mark P. Helsel, Seattle, WA (US); Dean R. Brown, Lynnwood, WA (US); Randall B. Sprague, Carnation, WA (US); Wyatt O. Davis, Bothell, WA (US)

(73) Assignee: Microvision, Inc., Redmond, WA (US)

( * ) Notice: Subject to any disclaimer, the term of this patent is extended or adjusted under 35 U.S.C. 154(b) by 196 days.

(21) Appl. No.: 10/986,635

(22) Filed: Nov. 12, 2004

(65) Prior Publication Data

US 2005/0173770 A1    Aug. 11, 2005

Related U.S. Application Data

(60) Provisional application No. 60/571,133, filed on May 14, 2004, provisional application No. 60/542,896, filed on Feb. 9, 2004.

(51) Int. Cl.
*H01L 21/00* (2006.01)

(52) U.S. Cl. .............. 438/48; 438/45; 438/52; 438/53; 438/735; 257/E21.002

(58) Field of Classification Search ............ 438/39, 438/52–53, 700, 702, 719, 735–737, 739, 438/753, 22, 45, 48, 50; 257/E21.002
See application file for complete search history.

(56) References Cited

U.S. PATENT DOCUMENTS

| | | | |
|---|---|---|---|
| 4,530,138 A | 7/1985 | Ritter | |
| 4,856,858 A | 8/1989 | Koike et al. | |
| 5,109,276 A | 4/1992 | Nudelman et al. | |
| 5,543,956 A | 8/1996 | Nakagawa et al. | |
| 5,861,979 A | 1/1999 | Ji et al. | |
| 5,912,608 A | 6/1999 | Asada | |
| 5,969,465 A | 10/1999 | Neukermans et al. | |
| 5,982,528 A | 11/1999 | Melville et al. | |
| 6,049,407 A | 4/2000 | Melville et al. | |
| 6,069,726 A | 5/2000 | Hughes et al. | |

(Continued)

FOREIGN PATENT DOCUMENTS

EP    0620415    10/1994

(Continued)

OTHER PUBLICATIONS

Nobuakai, Asai et al., "A Novel High Resolution Optical Scanner Actuated by Aerosol Deposited PZT Films", *IEEE pp. 247-250, Nagoya, Japan, 2003*, 247-250.

(Continued)

*Primary Examiner*—Thanhha Pham
(74) *Attorney, Agent, or Firm*—Kevin D. Wills

(57) ABSTRACT

Devices are formed on a semiconductor wafer in an interdigitated relationship and are released by deep reactive ion etching. MEMS scanners are formed without a surrounding frame. Mounting pads extend outward from torsion arms. Neighboring MEMS scanners are formed with their mounting pads interdigitated such that a regular polygon cannot be formed around a device without also intersecting a portion of one or more neighboring devices. MEMS scanners may be held in their outlines by a metal layer, by small semiconductor bridges, or a combination.

13 Claims, 12 Drawing Sheets

U.S. PATENT DOCUMENTS

| | | |
|---|---|---|
| 6,107,115 A | 8/2000 | Atobe et al. |
| 6,198,565 B1 | 3/2001 | Iseki et al. |
| 6,243,186 B1 | 6/2001 | Melville |
| 6,245,590 B1 | 6/2001 | Wine et al. |
| 6,259,548 B1 | 7/2001 | Tsugai et al. |
| 6,285,485 B1 | 9/2001 | Ferriera |
| 6,360,035 B1 | 3/2002 | Hurst, Jr. et al. |
| 6,392,220 B1 | 5/2002 | Slater et al. |
| 6,449,079 B1 | 9/2002 | Herrmann |
| 6,463,085 B1 | 10/2002 | Tayebati |
| 6,672,732 B1 | 1/2004 | Niendorf et al. |
| 6,769,616 B2 | 8/2004 | Ting-Tung et al. |
| 6,839,172 B1 | 1/2005 | Motamedi et al. |
| 6,912,078 B2 | 6/2005 | Kudrle et al. |
| 6,963,679 B1 | 11/2005 | Novotny et al. |
| 6,965,177 B2 | 11/2005 | Turner et al. |
| 6,999,215 B2 | 2/2006 | Dewa et al. |
| 7,050,211 B2 | 5/2006 | Orcutt |
| 7,053,520 B2 | 5/2006 | Zetti et al. |
| 7,067,344 B1* | 6/2006 | Oguchi .................. 438/53 |
| 2001/0052834 A1 | 12/2001 | Asada |
| 2002/0011759 A1* | 1/2002 | Adams et al. ............... 310/309 |
| 2002/0044276 A1 | 4/2002 | Stoner et al. |
| 2002/0122217 A1 | 9/2002 | Nakajima |
| 2002/0125325 A1 | 9/2002 | Plesko |
| 2002/0149294 A1 | 10/2002 | Matsumoto et al. |
| 2002/0171901 A1 | 11/2002 | Bernstein |
| 2003/0016428 A1 | 1/2003 | Kato et al. |
| 2003/0032215 A1 | 2/2003 | Ives |
| 2003/0053186 A1 | 3/2003 | Arima |
| 2003/0072066 A1 | 4/2003 | Hayashi et al. |
| 2003/0122066 A1 | 7/2003 | Dunfield |
| 2003/0137711 A1 | 7/2003 | Yagi et al. |
| 2003/0169055 A1 | 9/2003 | Klement |
| 2003/0209073 A1 | 11/2003 | Carroll et al. |
| 2003/0223679 A1 | 12/2003 | Mala et al. |
| 2004/0007069 A1 | 1/2004 | Turner et al. |
| 2004/0008400 A1 | 1/2004 | Hill et al. |
| 2004/0060898 A1* | 4/2004 | Tsai .............................. 216/2 |
| 2004/0232107 A1* | 11/2004 | Kouma et al. ................. 216/41 |
| 2005/0018322 A1 | 1/2005 | Ben-Gad et al. |
| 2005/0045727 A1 | 3/2005 | Y-Chung |

FOREIGN PATENT DOCUMENTS

| | | |
|---|---|---|
| EP | 0692729 | 1/1996 |
| EP | 1197779 | 4/2002 |
| EP | 1275997 | 1/2003 |
| EP | 1338912 | 8/2003 |
| JP | 09197334 | 7/1997 |
| JP | 2000-214407 | 8/2000 |
| JP | 2004-069731 | 3/2004 |
| WO | WO 01/46741 | 6/2001 |
| WO | WO 03/062899 | 7/2003 |

OTHER PUBLICATIONS

Schenk, Harald et al., "A Resonantly Excited 2D-Micro-Scanning-Mirror with Large Deflection", *Sensors and Actuators, A 89* 2001, 104-111.

PCT International Search Report PCT/US2005/004065, Dec. 14, 2005.

* cited by examiner

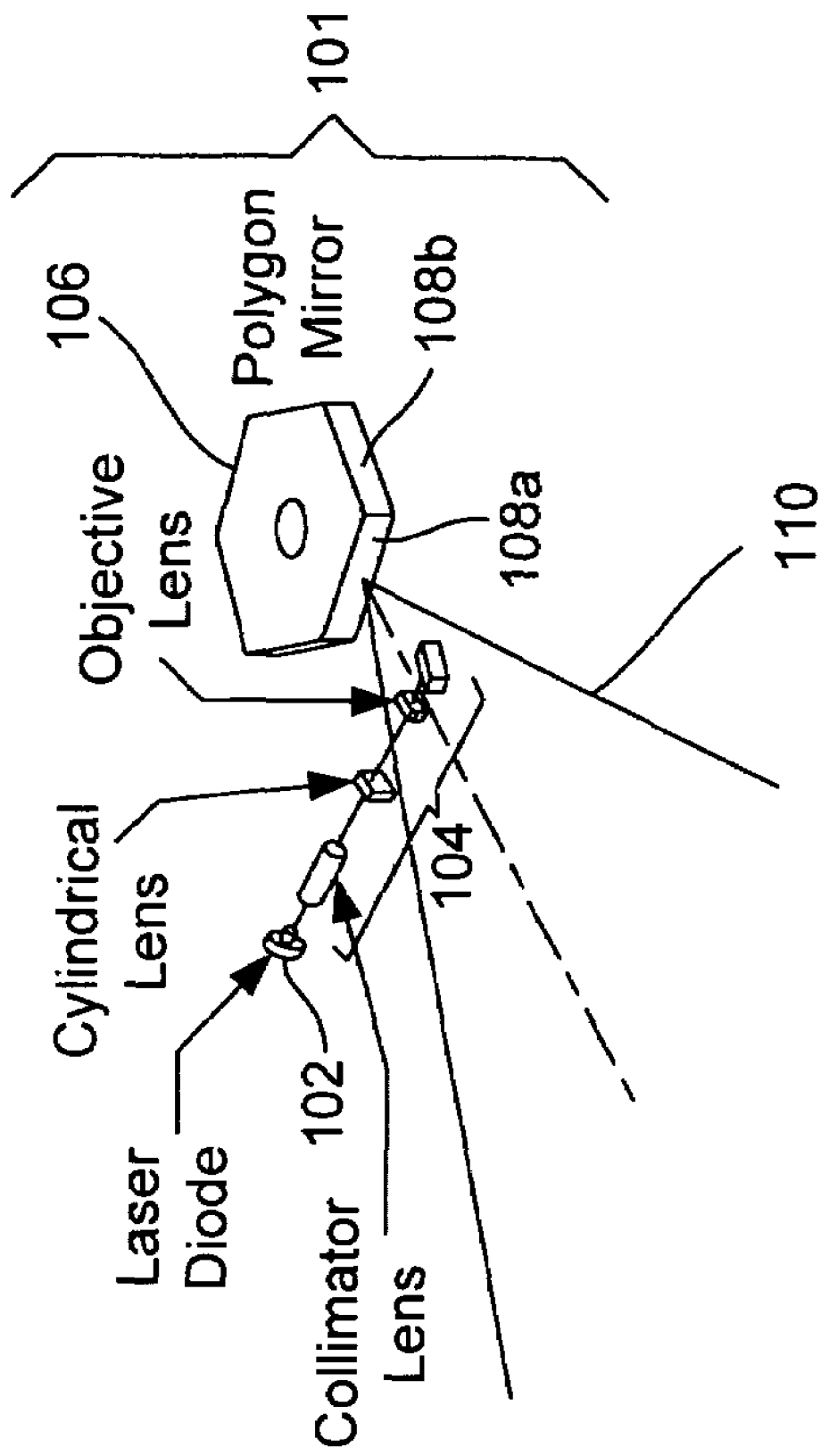

METHOD AND APPARATUS FOR MAKING A MEMS SCANNER

CROSS REFERENCE TO RELATED APPLICATIONS

This application claims benefit from the U.S. Provisional Patent Application Ser. No. 60/571,133, entitled MEMS DEVICE HAVING SIMPLIFIED DRIVE, invented by Randall B. Sprague et al., applied for on May 14, 2004, and claims benefit from U.S. Provisional Patent Application Ser. No. 60/542,896, entitled MEMS SYSTEM ADAPTED TO A LASER PRINTER, invented by Wyatt O. Davis et al., applied for on Feb. 9, 2004.

This application also relates to material in the co-pending U.S. patent application Ser. No. 10/986,640 entitled HIGH PERFORMANCE MEMS SCANNER, invented by Wyatt O. Davis et al., applied for on the same date as this application.

This application also relates to material in the co-pending U.S. patent application Ser. No. 10/988,155 entitled METHOD AND APPARATUS FOR SCANNING A BEAM OF LIGHT, invented by Greg Gibson et al., applied for on the same date as this application.

FIELD OF THE INVENTION

The present invention relates to microelectromechanical system (MEMS) beam scanners and particularly to methods and apparatus for making semiconductor MEMS scanners.

BACKGROUND

Beam scanning has become important for a variety of applications including scanned beam displays, bar code scanners, and electrophotographic printers. In prior art beam scanning applications, and especially in high performance applications, rotating polygon scanners have been in common use.

By way of example, the operation of a rotating polygon scanner in a beam scanning system will be described. FIG. 1 is a diagram illustrating the principal features of a typical rotating polygon-based beam scanning system 101. A laser diode 102 having a wavelength matched to the requirements of the application may optionally be modulated with an image data signal if required. Beam-forming optics 104 produce a laser beam having a desired shape and trajectory. The laser beam is reflected off a rotating polygon mirror 106, and particularly off the facets 108 thereof, individual facets 108a and 108b being indexed for clarity. It may be noted that the design of the beam scanning system 101 is such that the reflective surfaces 108a, 108b, etc. of the rotating polygon 106 are placed forward of the center of rotation such that the arriving beam sweeps over each mirror surface as the mirror surface is rotated. The beam is deflected across a deflection angle to form a scanned (and optionally, modulated) beam 110.

One difficulty encountered with rotating polygon-based beam scanning systems relates to the rotating polygon itself. Rotating polygon mirrors may suffer from relatively large mass, slow ramp-up to speed, large size, noise, bearing reliability issues, relatively high power consumption, and other shortcomings.

As mentioned above, high speed bar code scanners have typically used rotating polygon mirrors to produce scan rates and resolutions sufficient for throughput-sensitive applications such as in-counter scanning at retail check-out and high-speed package sorting. One example of such a scanner is described in U.S. Pat. No. 6,045,046 of Paul O. Detwiler, entitled FULL COVERAGE BARCODE SCANNER, hereby incorporated by reference. It may be noted that other such examples do not vary the angle of the polygon facets to create parallel scan paths, instead including in the scan path a vertical scan mirror that oscillates about the second axis.

As mentioned above, scanned beam displays also use beam scanners. Various scanned beam display embodiments have been disclosed in the art. One such example includes scanned beam displays such as that described in U.S. Pat. No. 5,467,104 of Furness et al., entitled VIRTUAL RETINAL DISPLAY, which is incorporated herein by reference. Similarly, electrophotographic printers (commonly referred to as "laser printers"), LIDAR systems, rotating laser levels, document scanners, and other beam scanning systems have heretofore made use of rotating polygon beam scanners. To a greater or lesser degree, these and other applications, when embodied using rotating polygon scanners, have suffered from the drawbacks inherent thereto.

In other applications, beam scanner performance may be conveniently characterized as the product of scan angle times mirror size, as a function of scan frequency. According to common usage, the product may be referred to as "theta-D" ($\Theta D$) where theta refers to half the mechanical scan angle and "D" refers to mirror size. Implicit in this terminology is the assumption that static and dynamic deformation of the scan mirror surface remains within acceptable limits, frequently no more than ⅕ of the shortest wavelength of light being deflected ($\lambda/5$). Since a larger mirror size enables a smaller diffraction limited beam spot and a larger deflection angle allows a greater field width at a given distance over which to line up a row of spots, $\Theta D$ is proportional to the number of spots that may be resolved (e.g. displayed or detected) in a scan line. Frequency, of course, relates to the number of scan lines that may be produced per unit time. Hence, a larger $\Theta D$ scanner generally corresponds to higher performance.

According to the prior art, it has proven relatively difficult to achieve high $\Theta D$ at high scan frequencies while maintaining sufficient mirror flatness. Dynamic stresses on scan mirrors work against keeping mirrors flat when they are operated at combinations of relatively large scan angle, high frequency, and with a large mirror size.

Overview

According to one aspect, a microelectromechanical system (MEMS) beam scanner is disclosed that attains high performance. In particular, various embodiments are operable with a relatively large $\Theta D$ product at relatively high scan frequency, all while maintaining sufficient mirror flatness to meet system requirements.

Another aspect relates a MEMS beam scanner having performance and properties that make it amenable for use in applications that have heretofore been the domain of rotating polygon scanners. The use of such an approach can result in reduced mass and size, faster start-up, reduced noise, higher reliability, and other advantages compared to rotating polygon mirrors.

According to an aspect of the invention, a MEMS beam scanner may be formed with physical and operational attributes; including mirror size, scan angle, scan frequency, and mirror flatness; to be especially well-adapted to replace a rotating polygon mirror in a range of applications. For some applications, a MEMS mirror with extended length transverse the scanning axis can be substituted for a rotating polygon without substantial modifications to existing optical designs.

According to another aspect, a MEMS scanner is formed having torsion arm geometry adaptable to a large scan angle.

The torsion arms may be several times longer than the longitudinal dimension of the mirror surface.

According to another aspect, leverage members are formed on the distal end of the torsion arms (away from the scan mirror). The leverage members serve to reduce stress concentrations, enlarge the scan angle, provide connection to laterally-displaced mounting pads, and create a moment arm for driving the scanner from an off-chip actuator.

According to another aspect of the invention, a MEMS scanner is mounted to an actuator assembly using a clamping pressure that holds mounting pads in substantially continuous contact with a linear actuator. When the linear actuator is a piezo-electric actuator stack, for example, this positive pressure maintains compressive force or minimizes tension forces in the piezo-electric actuator stack, thereby improving reliability, robustness, and/or life.

According to another aspect, a heater varies the spring constant of a MEMS torsion arm, thus modifying the resonant frequency of a scanning mirror supported therefrom. The fineness of resonance frequency control thus achieved allows operation of the MEMS scanner close to its resonant frequency. Heating may be accomplished by joule heating of the bulk semiconductive material, such as silicon, within at least portions of the MEMS scanner itself. A doping process optionally creates a charge carrier channel having a graded resistivity vs. depth. Metal layers may be applied to regions of the MEMS scanner to reduce subjacent joule heating within such regions.

According to another aspect, a MEMS scanner may be formed having no outer frame, such as a photolithographically-formed frame. Instead, a plurality of mounting pads may be formed.

According to another aspect, a number of MEMS scanners are formed on a silicon wafer having a plurality of mounting pads. The irregularly shaped devices are formed on a silicon wafer in an interlaced manner with mounting pads overlapping, e.g. intruding into the area of neighboring dies that would heretofore have been occupied by a frame. Devices are almost released from the silicon wafer using a deep etching process such as deep reactive ion etch (DRIE). One or more "lands" or "bridges" maintain connection between the part and the wafer or between adjacent parts to mechanically stabilize the wafer. The bridges are subsequently broken to remove the parts.

According to another aspect, a scanner controller includes provision for maintaining a scanner resonant frequency that matches a system operational frequency. In an exemplary embodiment, this is implemented as a phase difference driven servo control loop.

According to another aspect, a scanner controller includes a heater amplifier for applying a current to a scanner heater.

According to another aspect, a MEMS scanner controller includes a phase servo control loop to lock a scanner phase to a system phase.

According to another aspect, a scanner controller includes one or more servo loops that operate in a pseudo-locked state during a system idle process, thus allowing faster start-up.

According to another aspect, a MEMS scanner controller applies a drive voltage during start-up that is significantly higher than the drive voltage used during operation. The high drive voltage is useful for achieving faster start-up.

Other aspects will become apparent to the reader through reference to the appended brief description of the drawings, detailed description, claims, and figures.

BRIEF DESCRIPTION OF THE DRAWINGS

FIG. 1 is a diagram illustrating a beam scanning system with a rotating polygon scanner.

DETAILED DESCRIPTION

Figure 2A:
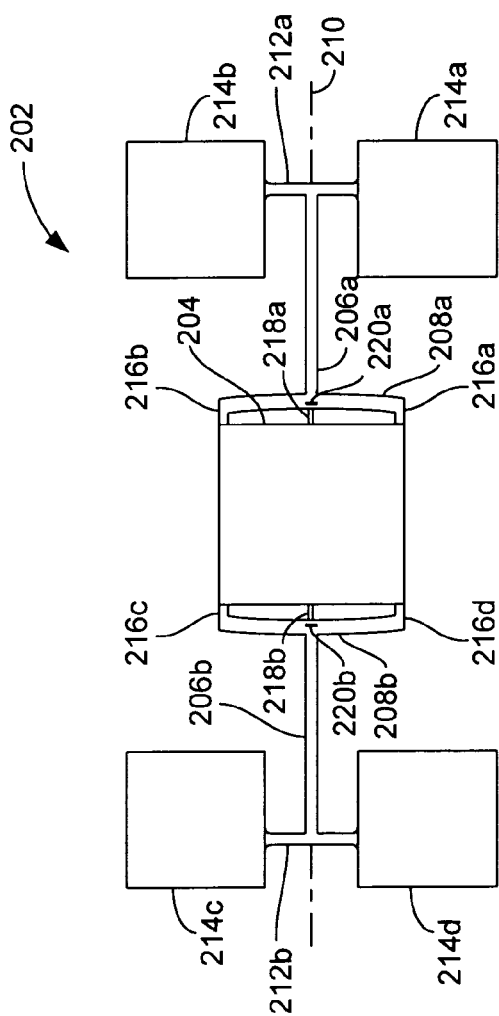
FIG. 2A is a top view of a MEMS scanner made according to one embodiment.

FIG. 2A illustrates one embodiment of a high performance MEMS scanner 202. MEMS scanner 202 may be used in a variety of applications, including for instance, a high speed, high resolution LBP, a high-speed bar code scanner, a scanned beam display, a LIDAR system, a scanned laser level, and other applications. MEMS scanner 202 is photolithographically formed from single-crystal silicon using bulk micromachining as is known to the art. A scan plate 204 having a mirror surface is coupled to a pair of torsion arms 206a, 206b through respective suspensions; the suspensions consisting of suspension beams 208a, 208b, suspension center connectors 218a, 218b, and suspension outer connectors 216a, 216b, 216c, 216d as indicated. Torsion arms 206a, 206b define a rotational axis 210 about which scan plate 204 and suspension beams 208a, 208b rotate. As may be appreciated from the teaching of U.S. Provisional patent application Ser. No. 60/571,133, entitled MEMS DEVICE HAVING SIMPLIFIED DRIVE, invented by Randall B. Sprague et al., applied for on May 14, 2004, commonly assigned herewith and herein incorporated by reference, the suspensions help to keep the mirror surface relatively flat, typically within ¼ wavelength, by spreading the torque loads induced by the torsion arms 206a, 206b across the surface of the scan plate 204.

Suspension beams 208 are each coupled to scan plate 204 by respective outer (lateral) connectors 216a, 216b, 216c, 216d and respective axial connectors 218a, 218b. Taken together, suspension elements 208a, 216a, 216b, and 218a form a first suspension coupling between first torsion arm 206a and scan plate 204. Similarly suspension elements 208b, 216c, 216d, and 218b form a second suspension coupling between second torsion arm 206b and scan plate 204.

Torsion arms 206a, 206b terminate at respective "leverage members" 212a and 212b. Leverage members 212a and 212b, in turn connect to respective mounting pads 214a, 214b and 214c, 214d at respective lateral points as illustrated. Taken together, leverage member 212a and mounting pads 214a, 214b constitute a first mounting structure for coupling torsion arm 206a to a support structure (not shown). Similarly, leverage member 212b and mounting pads 214c, 214d form a second mounting structure for coupling torsion arm 206b to a support structure (not shown). In alternative embodiments, mounting structures can take other forms, including for example a pair of rectangular mounting pads, each joined directly to a respective torsion arm, a single frame formed peripheral to the scan plate 204 and torsion arms 206a, 206b, or other forms. The exemplary embodiment of FIG. 2A may have certain advantages such as, for example, packing more devices per wafer, having reduced dynamic stress, allowing individual mounting pads to be coupled to actuators, and allowing the mounting pads 214 to "float" relative to one another, thereby reducing residual stresses in the MEMS scanner.

In an alternative embodiment, the leverage members 212a and 212b join to a peripheral mounting frame at lateral points, the peripheral frame surrounding the scan plate, torsion arms, and leverage members according to a conventional MEMS arrangement.

Scan plate 204 and the mirror thereon may be formed, for example, to have a lateral extent (in the direction perpendicular to the axis of rotation 210) that is substantially greater than its longitudinal extent (in the direction parallel to the axis of rotation 210). Among other considerations, this may be used advantageously to mimic the facet of a rotating polygon mirror, thus aiding in the use of scanner 202 as a replacement for a rotating polygon scanner in a variety of applications. Alternatively, scan plate 204 may be formed as a lower aspect ratio rectangle, square, circle, ellipse, or other shape as may be appropriate for a given application.

As illustrated in FIG. 2A, MEMS scanner 202 includes two torsion arms 206a, 206b, each 18.76 millimeters long (including fillets), terminated on their proximal ends by a 400 micron by 200 micron elliptical fillet at respective suspensions (in particular at suspension beams 208a, 208b), and terminated on their distal ends at respective leverage members 212a, 212b, again with a 400 micron by 200 micron elliptical fillet. The torsion arms 206a, 206b are 384 microns wide. As with the rest of MEMS scanner 202, the torsion arms are etched to a full wafer thickness of 700 microns using DRIE processing. For a given mirror mass, the width, depth, and length of the torsion arms and leverage members may be adjusted to produce alternative resonant scan frequencies and angles.

The suspension beams 208a, 208b are 396 microns wide and are slightly bent to make a slightly obtuse angle with respective torsion arms 206a, 206b of 91.6 degrees, and extend laterally to an extent equal to the lateral extent of the scan plate 204. Respective suspension center connectors 218a, 218b extend from the centerlines of suspension beams 208a, 208b to the centerline of the scan plate 204, a distance of 500 microns (including fillets). The center connectors 218a, 218b are each 164 microns wide and include 100 micron radius fillets at both ends. Four suspension outer connectors 216a, 216b, 216c, and 216d extend from the ends of suspension beams 208a, 208b to the scan plate 204, one on each end of each suspension beam as indicated. The outer connectors 216a, 216b, 216c, 216d are each 250 microns wide (laterally) by 400 microns long (longitudinally) and do not have fillets. The respective suspensions thus each include a suspension beam 208, a center suspension connector 218, and two outer suspension connectors 216; and connect the torsion arms 206a, 206b to the scan plate 204 in a manner that reduces stress concentrations, spreads the torque load, and reduces dynamic deformation of the scan plate during operation. Alternative suspension configurations are possible and could be implemented by one skilled in the art.

The scan plate of the exemplary embodiment of FIG. 2A is 6 millimeters by 6 millimeters square.

The leverage members 212a, 212b are each 1.8 millimeters long (total lateral dimension inclusive of fillets) by 400 microns wide (longitudinal dimension) and, for the example of FIG. 2A, extend symmetrically from and perpendicular to the axis formed by torsion arms 206a, 206b. The outer ends of leverage members 212a, 212b connect to four respective mounting pads 214a, 214b, 214c, 214d with 200 micron radius fillets as shown. The mounting pads are each 5 millimeters square.

Doped channels are formed at 220a and 220b and on the mounting pads 214a, 214b, 214c, and 214d. Metal is deposited on mounting pads 214a, 214b, 214c, and 214d, superajacent to the doped channels. Metal is also deposited on the scan plate 204 and extending over center suspension connectors 214a, 214b, to points overlapping doped channels 220a and 220b. As will be described below, the doped channels form regions of relatively low and graded resistivity that help current to flow between non-metallized regions and the metal layers. The metal, which may be for example gold or aluminum, forms a mirror surface on scan plate 204.

The geometry of the leverage members may be varied considerably. Similarly, mounting pad geometries, including size, shape, and direction of connection with the leverage members connect, may be adjusted to suit application requirements. Additionally, leverage members, mounting pads, and other parts of the MEMS scanner 202 may be formed asymmetrically according to application requirements. For example, as will be seen in conjunction with FIG. 2B, an entire set of two mounting pads, two leverage members and one torsion arm may be deleted.

The geometries of the scan plate 204, suspensions (corresponding to elements 208a, 216a, 216b, 218a and 208b, 216c, 216d, 218b, respectively) and torsion arms 206a and 206b may similarly be varied considerably. For example, if a 4 millimeter by 4 millimeter scan plate 204 is substituted for the 6 millimeter by 6 millimeter scan plate of FIG. 2A, the torsion arm lengths may be shortened by 12 millimeters each, while maintaining approximately constant resonant frequency and material stress limits. Suspensions may also be varied considerably while maintaining the advantage of reducing scan plate dynamic deformation.

When mounting pads 214a, 214b, 214c, and 214d (or alternative peripheral frame) are mounted to a housing, periodic application of power to an actuator (not shown) will cause scan plate 204 to periodically rotate back and forth about the axis of rotation 210 defined by torsion arms 206a, 206b. For one embodiment, when driven with an appropriate signal (such as a 5 kilohertz (KHz) sine wave varying between about 0 (zero) and 25-30 volts for a four-actuator embodiment) the scan plate 204 responds with a ±20° mechanical scan angle at a frequency of 5 KHz.

At a mechanical scan angle of ±20°, the scanner 202 exhibits a scan angle approximately equivalent to a nine-sided rotating polygon. Other scan angles may be chosen to match other polygon shapes. At a full period scan rate of 5 KHz, scanner 202 produces bidirectional scans (one forward and one reverse scan during each cycle) at a rate of 10 KHz. This is approximately equivalent to a nine-sided polygon mirror rotating at 66,667 RPM. Thus, scanner 202 can achieve the scanning performance of a relatively sophisticated rotating polygon scanner, making it suitable for high speed applications. Alternatively, the scanner may be used to scan unidirectionally, making it approximately equivalent to a 33,333 RPM nine-sided rotating polygon scanner. Unidirectional operation is achieved simply by modulating image data (or capturing image data) only when the mirror is in one of the forward or reverse scan half-cycles. When used bi-directionally, suitable control electronics are used to reverse the data read-out (to the laser or from the detector) during reverse scans.

Figure 2B:
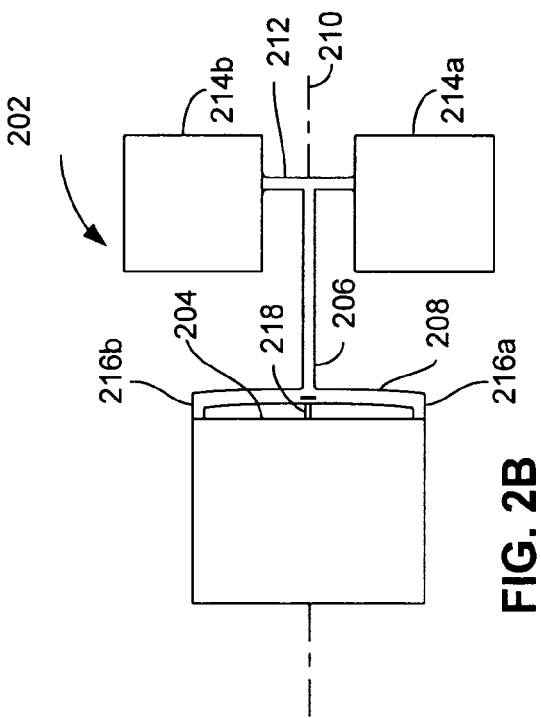
FIG. 2B is a top view of a MEMS scanner made according to another embodiment.

FIG. 2B illustrates an alternative embodiment of a MEMS scanner 202. A single torsion arm supports a scan plate 204 through a suspension as described in conjunction with FIG. 2A. The scan plate may be rotated around axis 210 by properly controlling the resonant frequencies of various modes and/or by driving the scan plate at or very near its resonant frequency, as will be described below.

Figure 3:
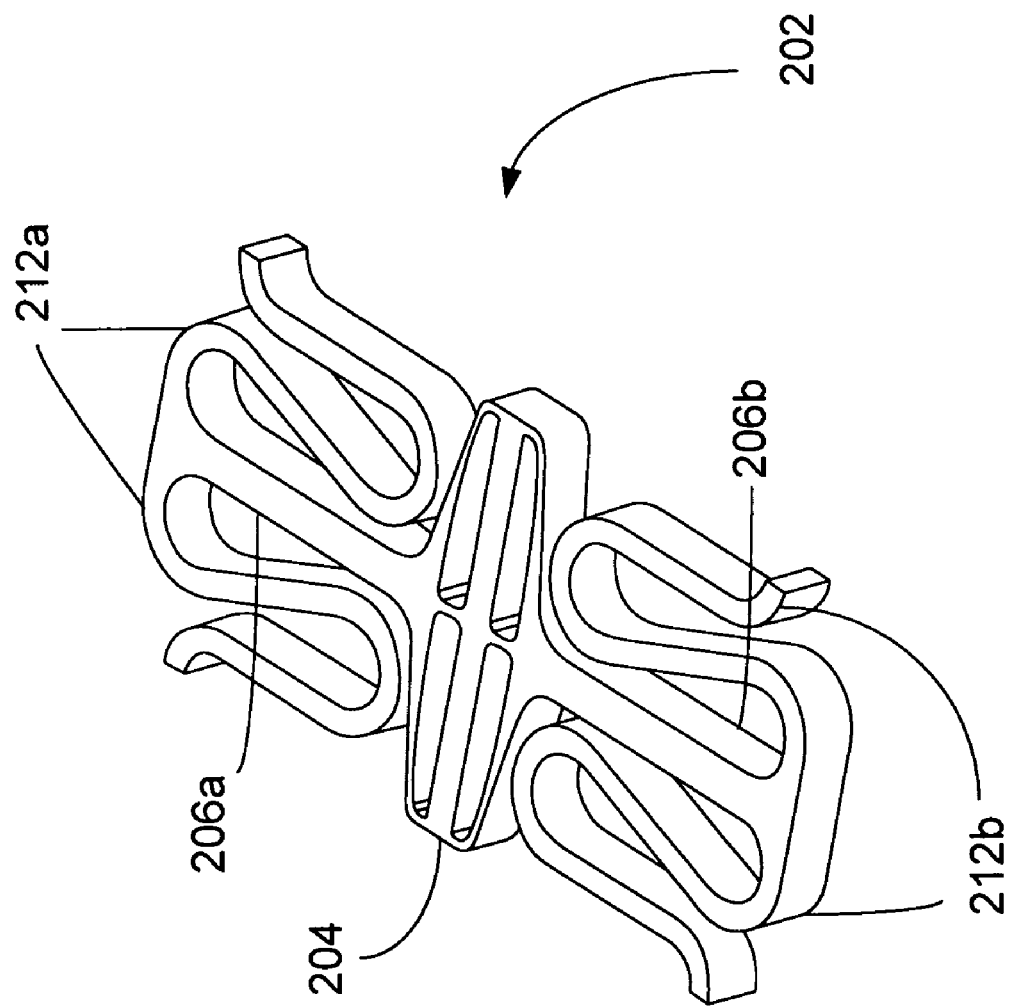
FIG. 3 is a perspective view of a MEMS scanner made according to another embodiment.

FIG. 3 illustrates another alternative embodiment of a MEMS scanner 202. In the exemplary embodiment of FIG. 3, the leverage members 212a and 212b are formed in a serpentine shape. The distal ends of the leverage members would typically join to mounting pads, as illustrated above, or alternatively to a peripheral frame member. As may be appreciated, the geometry of the leverage members may be altered substantially.

Figure 4:
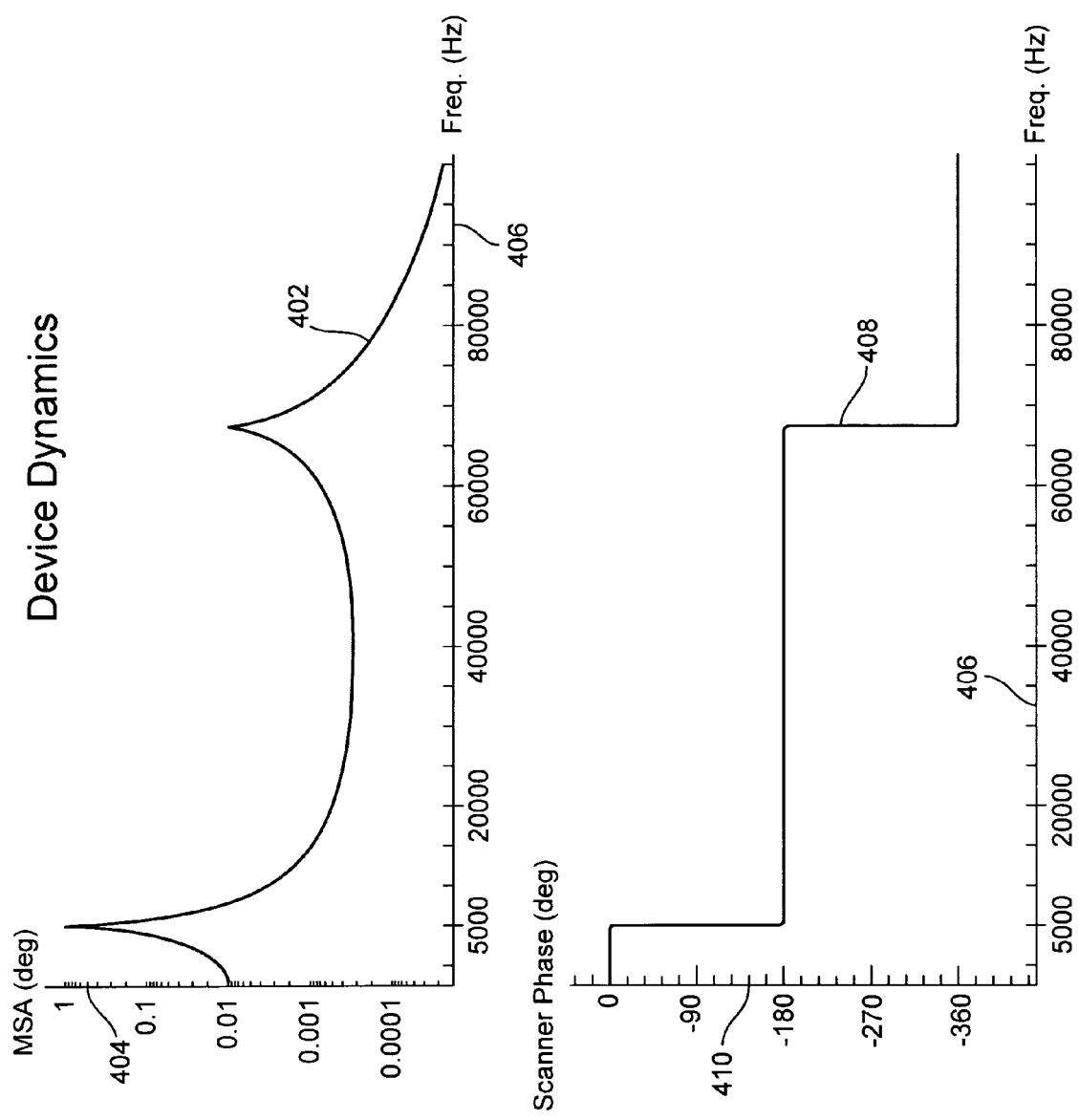
FIG. 4 is a graph illustrating the dynamic response of the MEMS scanner of FIG. 3.

FIG. 4 shows graphs illustrating the dynamic response of the MEMS scanner of FIG. 2A when a periodic drive signal is applied. Curve 402 indicates an amplitude response 404 as a function of periodic drive frequency 406. Curve 408 illustrates scanner vs. drive phase 410 plotted against the same periodic drive frequency axis 406. From inspection of curve 402, one can see a peak in response at about 5 KHz, corresponding to the resonance frequency of the MEMS scanner in the rotation mode. While the size of the peak is plotted on a relative basis, it is, for the exemplary embodiment, sufficiently high to produce a resonant response of ±20° mechanical scan angle at acceptable drive power. For a four-actuator embodiment, a drive waveform approximating a 5 KHz sine wave with amplitude of 0 (zero) to 25-30 volts results in ±20° mechanical scan angle.

The secondary peak at between 65 and 70 KHz corresponds to the resonant behavior of the piezo-electric stack actuators.

Curve 408 illustrates how the phase relationship of the drive signal to the MEMS scanner response inverts at the resonance points. Below 5 KHz, the phase relationship (drive to response) is 0°. Above 5 KHz but below the secondary peak, the phase relationship is −180°. At the primary resonant peak, the phase relationship inverts and passes through −90° (response lagging drive) as indicated. Above the secondary peak, the response of the system drops and the phase response again inverts, passing from −180° below the peak, through −270°(+90°) at the secondary resonance peak, to −360° (0°) at frequencies above the secondary resonance peak. To maximize efficiency, it has been found to be advantageous to operate the MEMS scanner at or very near the primary resonance peak.

For operation at 5 KHz, the resonant frequency of the MEMS scanner is trimmed to be a few hertz above 5 KHz, typically in the range of 5.001 to 5.005 KHz at room temperature. Such trimming may be accomplished using methods described in U.S. Pat. No. 6,245,590, entitled FREQUENCY TUNABLE RESONANT SCANNER AND METHOD OF MAKING, commonly assigned herewith and hereby incorporated by reference. It has been found to be advantageous to factory trim the resonant frequency using a method of adding weight to the scan plate in the form of a small quantity of epoxy. Active thermal tuning of the resonant frequency is used to make the resonant frequency substantially 5.000 KHz.

Figure 5A:
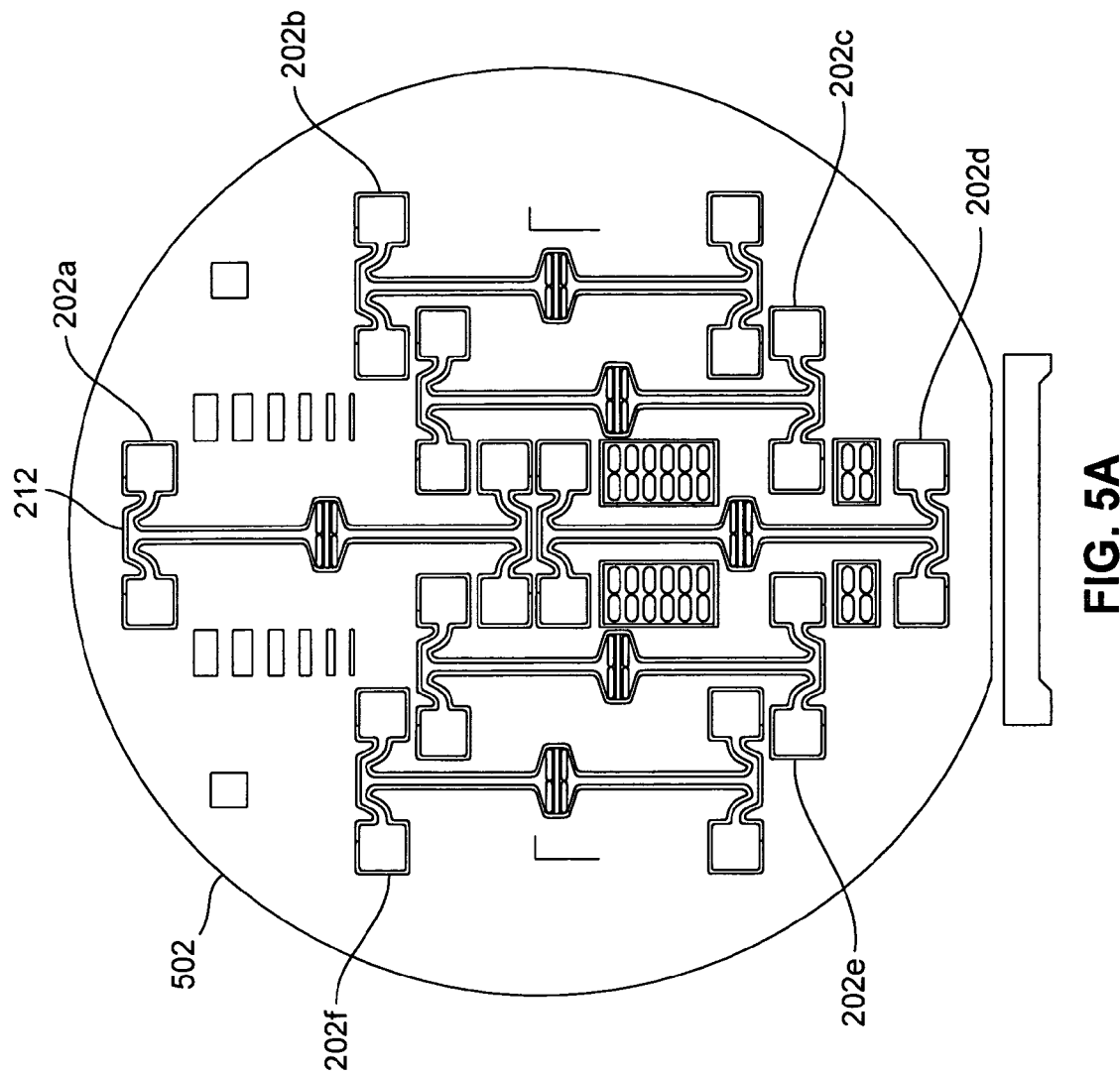
FIG. 5A is a view of a number of MEMS devices showing how they are arrayed on a silicon wafer during manufacture.

FIG. 5A illustrates a prototypical layout of MEMS scanners 202a, 202b, 202c, 202d, 202e, and 202f on a 100 millimeter silicon wafer 502. As may be seen, the MEMS scanners are densely packed with interdigitated mounting pads and mirrors. One reason for such a layout is to maximize yield per wafer. As may be seen the scan plates of scanners 202 shown in FIG. 5 are formed in a short and wide aspect ratio.

Figure 5B:
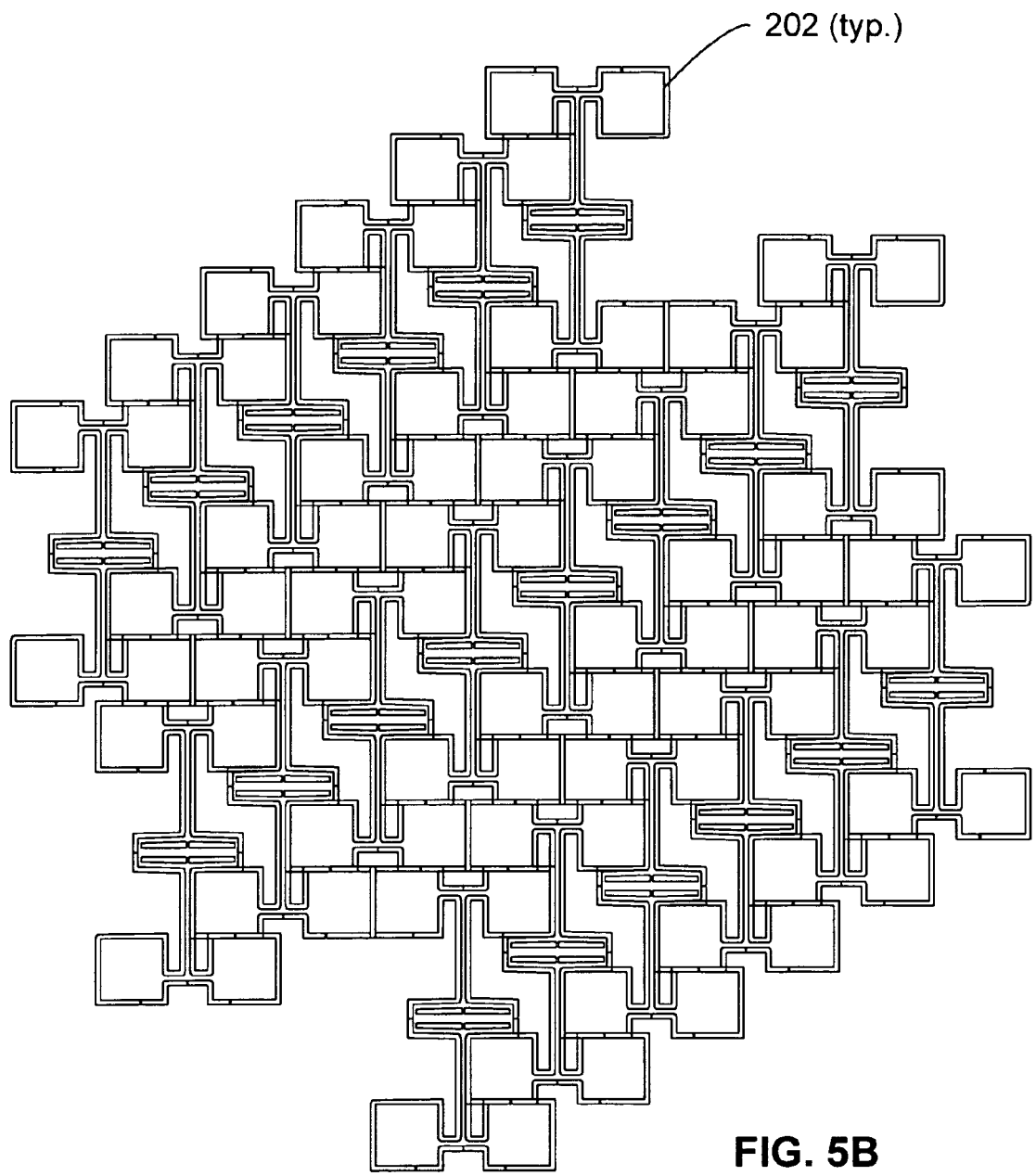
FIG. 5B illustrates an alternative layout of MEMS devices on a wafer.

FIG. 5B illustrates an alternative layout of MEMS scanners for fabrication from a 100 millimeter silicon wafer. The dimensions of the scanners, particularly the length of the torsion arms, has been adjusted for more efficient interdigitated packing compared to the layout of FIG. 5A. Larger wafers may also be densely packed with devices.

The term "interdigitated" means that it would not be possible to draw a square around or dice around one semiconductor device without cutting off a portion of one or more neighboring semiconductor devices. That is, one or more neighboring semiconductor devices intrudes into the outline of a geometric shape that could be formed around the semiconductor device using a dicing saw. An etching step such as deep reactive ion etch (DRIE) or other process step is used to almost completely release the scanners from the wafer. The double lines formed around each device indicate the edges of a "moat" formed around the device. Very fine silicon "bridges" may be seen connecting the scanners to the wafer at intervals. To release the scanners, these bridges are simply broken and the scanners popped out. The width of the bridges is set narrow enough to usually avoid propagating a crack across the device.

In an alternative embodiment, a layer of metal is plated, or an insulator wafer is bonded, on the back surface of the silicon wafer prior to DRIE. DRIE is used to etch through the silicon wafer. The layer of metal or insulator may then hold the scanners in the wafer. The metal may be torn to remove the scanners. Alternatively, the metal or the insulator may be etched away to free the parts. In one embodiment, aluminum is used for the metal stabilization layer. In one embodiment, PYREX glass is used for the insulator stabilization layer. When such stabilization layers are used, silicon bridges may be used in combination to hold the shapes in place. Alternatively, the silicon bridges may be eliminated.

FIG. 5A further illustrates an alternate leverage member 212 design wherein the ends of the "T" are offset toward the mirror.

Fabrication of a MEMS scanner 202, according to some embodiments may include the formation of a doped channel or charge carrier layer as described above. Phosphorus-doped silicon wafers having a bulk resistivity of 1-10 ohm-cm are used. The phosphorous-doped silicon wafers are implanted at a dose of $5 \times 10^{15}$ phosphorus 31 atoms/cm$^2$ accelerated through 30 KeV at a maximum current of 4 mA. The dose of phosphorus is driven for 45 minutes at 1000°C. The resulting doped channel is heavily doped to a depth of about 0.5 microns forming a graded channel wherein the doping concentration and resultant resistivity vary with depth. For these conditions, the wafer surface has a doping concentration of about $1 \times 10^{20}$ phosphorus 31 atoms/cm$^3$, yielding a resistivity of about 0.001 ohm-cm, which falls to the wafer background of about $1 \times 10^{15}$ atoms/cm$^3$ (or 1-10 ohm-cm) at a depth of 0.5 microns.

The doped channel creates a conduit for charge carriers to move from the metal layers into the silicon. As will be described below, current may be applied to the MEMS scanner 202 to create joule heating. For the exemplary embodiment of the scanner of FIG. 2A, for example, mounting pads 214a, 214b may be driven to a positive voltage by a heater amplifier. Heater leads may couple to mounting assemblies and/or to a metallized layer on the mounting pads themselves. According to an exemplary embodiment, current flows along a metal layer that covers mounting pads 214a, 214b and moves into the silicon via the doped channels formed subjacent the metal. Current then flows within the silicon through leverage member 212a and torsion arm 206a, thus forming localized heating primarily in the torsion arm 206a. (Because the current flow is split along both arms of leverage member 212a, there is reduced joule heating within the leverage member.) Where torsion arm 206a meets doped channel 220a, current flows from the silicon and up into the metal layer formed overlapping doped channel 220a. Current flows across center suspension connector 218a, across the metal of the mirror formed on scan plate 204, and across center suspension connector 218b, thus avoiding joule heating within those structures. Where the metal layer overlaps doped channel 220b, current flows down from the metal and into the silicon. Current flows through the torsion arm 206b and leverage member 212b, again causing joule heating (primarily within the torsion arm). Current then flows through the doped channels formed on mounting pads 214c, 214d, and up into the metal layers formed thereon where it is collected by a second set of heater leads held near ground. As is known to the art, hole movement in the direction indicated or electron movement in the opposite direction may form such current flow.

In some cases, an advantageous aspect of the scanner designs exemplified by FIGS. 2A, 2B, 3, 5A and 5B is that a minimal number of process steps may used in fabrication. The scanners may be formed throughout from a full thickness of silicon wafer with no partial etching to reduce thickness of areas or produce raised ribs. A pattern of metallization corresponding to mirrors is formed on the front of wafer 502. According to one embodiment, gold metallization is used for the mirrors. Back metallization is formed on the back of wafer 502. According to one embodiment, aluminum is used for the back metallization layer. Next, a photoresist pattern corresponding to the semiconductor devices and the non-etched areas therebetween is formed on the front of the wafer, and the exposed areas are deep etched. In one embodiment, DRIE is used to etch vertical walls through the wafer. The back of the wafer is cryogenically cooled during etching and the high thermal conductivity of the aluminum back metallization stops the DRIE etch when it gets to the back surface of the silicon wafer. In some embodiments, the scanner shapes are held in the wafer by the thin aluminum layer bridging the back of the etched outlines. In other embodiments, thin bridges of silicon help to hold the parts in place. The aluminum back metallization is etched away and the photoresist is removed. The scanners are then free or, if silicon bridges are used, may be removed from the wafer and singulated by breaking the bridges across the deep-etched areas. Dicing may be avoided by using deep-etching to release the parts.

Figure 6:
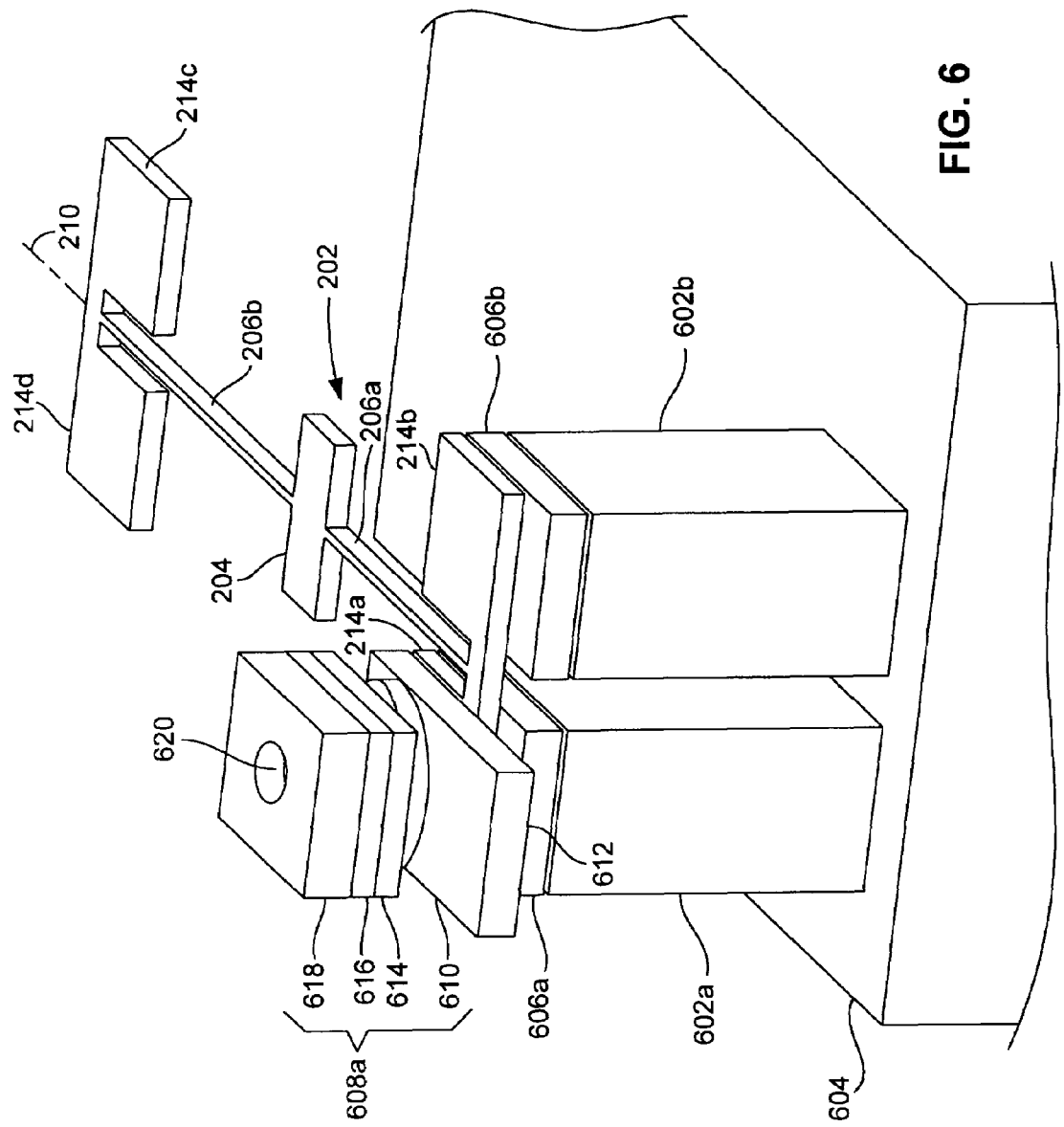
FIG. 6 is a view of a MEMS mounting clamp.

FIG. 6 illustrates an actuator arrangement for the MEMS scanner. A pair of commercially-available piezo-electric stacks 602a and 602b, set upon a common mounting base 604, support respective mounting pads 214a, 214b of MEMS scanner 202 through respective first insulators 606a, 606b. From their respective positions, the piezo-electric stacks 602a, 602b may be alternately electrically compressed and expanded to produce a periodic rotation of the mounting pads 214a, 214b about the axis of rotation 210 defined by torsion arms 206a, 206b. Similarly, common mode activation of the piezo-electric stacks 602a, 602b may be used to rotate the MEMS scanner 202 about a transverse axis substantially parallel to the transverse axis of the scan plate 204.

To maintain contact between the MEMS scanner 202 and the piezo-electric actuator stacks 602a, 602b, respective clamps or pressure assemblies 608a and 608b (608b not shown) press the mounting pads 214a, 214b down against the actuator stacks. Clamp 608b is omitted from FIG. 6 for clarity. As shown, clamps 608 include (starting from the bottom of the assembly and contacting the mounting pad 314) a first pressure plate 610, an optional series disk spring 612, a second pressure plate 614, a second insulator 616, and a third pressure plate 618. In one embodiment, an edge of first pressure plate 601 is extended out from the pressure assembly as shown. As will be explained below, this provides an optional bonding position for a heater wire or lead. Series disk spring 612 is of a commercially available type such as SPRING-MASTERS #D63203 and is selected to have relatively low stiffness but high (>>5 KHz) intrinsic resonant frequency. A series of two springs, a different number of springs, or no springs at all may be used, depending upon application requirements. First and second pressure plates 610 and 614 provide robust surfaces for series disk spring 612 to press against. Second insulator 616 provides for electrical insulation of the MEMS scanner 202. First and second insulators 606, 616 are formed from a material with appropriate density, electrical insulating ability, and compressive strength such as PYREX glass. First and second pressure plates 610, 614 are formed from materials that are suitably electrically conductive and have appropriate physical properties including compressive strength, toughness, and density, such as steel. Third pressure plate 618 provides a mounting surface for second insulator 616 and connects the assembly to a housing (not shown). Third pressure plate 618, preferably formed from steel, includes a bore 620 for receiving a mounting and adjustment screw (not shown). As may be appreciated by those skilled in the art, alternative or modified clamps may be used.

In an alternative embodiment, it has been found that the series disk spring 612 may be omitted from the pressure assemblies 608. Such a modification may offer advantages with respect to assembly ease and cost, but may hurt drive efficiency somewhat.

One or more components of the pressure assemblies 608 may optionally be keyed to a housing or otherwise held in a substantially fixed rotational relationship. This reduces or eliminates torque loads transmitted through the assemblies during adjustment of the mounting and adjustment screw. By substantially reducing or eliminating torque loads through the pressure assemblies 608, substantially zero torque load is applied to the mounting pads 214 of the MEMS scanner during assembly, thus protecting the MEMS scanner 202 from inadvertent changes in resonant frequency and/or scan angle range arising from slight rotation of the mounting pads 214.

Figure 7:
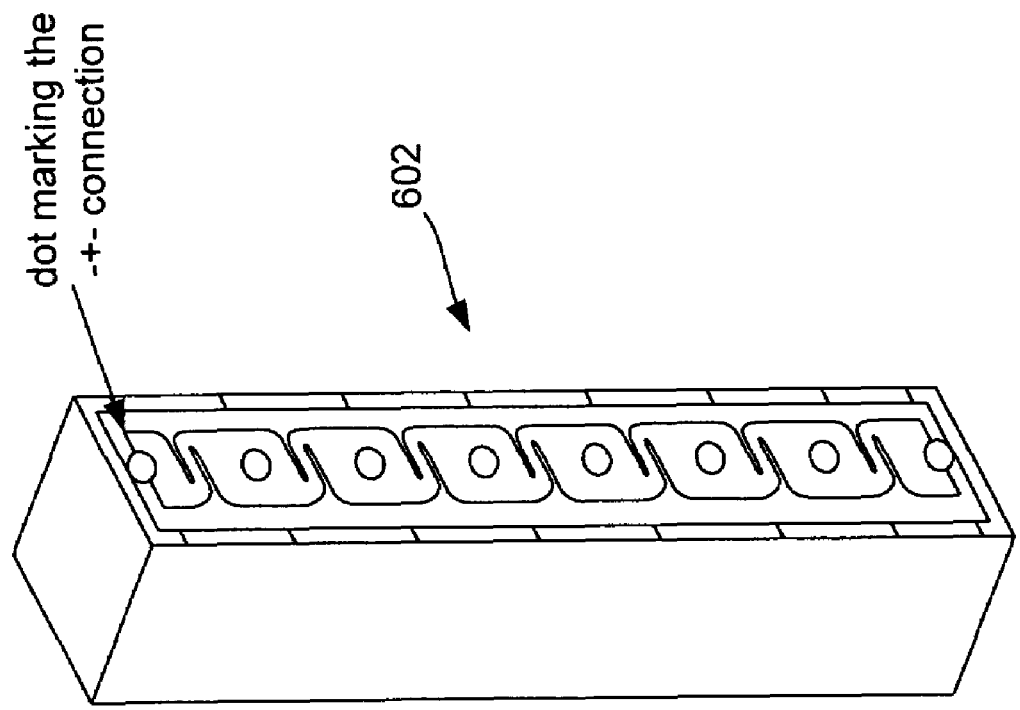
FIG. 7 is a detailed view of a piezo-electric stack used to form the actuator of FIG. 6.

FIG. 7 is a view of a piezo stack actuator 602. Such actuators are available form several sources including www.physikinstrumente.de model PICMA 885.10.

Figure 8:
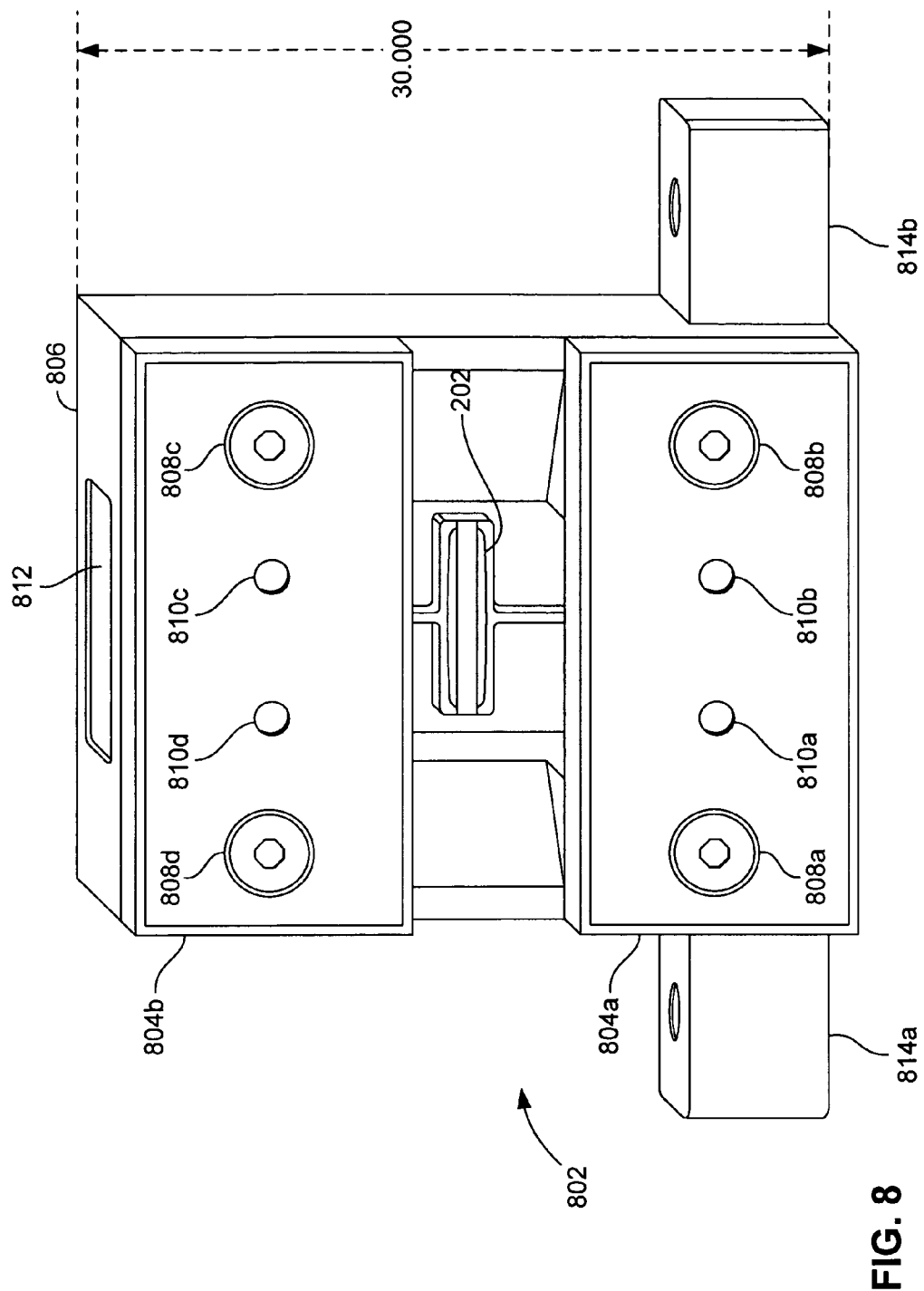
FIG. 8 is a front perspective view of a MEMS scanner package for use in a beam scanning subsystem.
Figure 9:
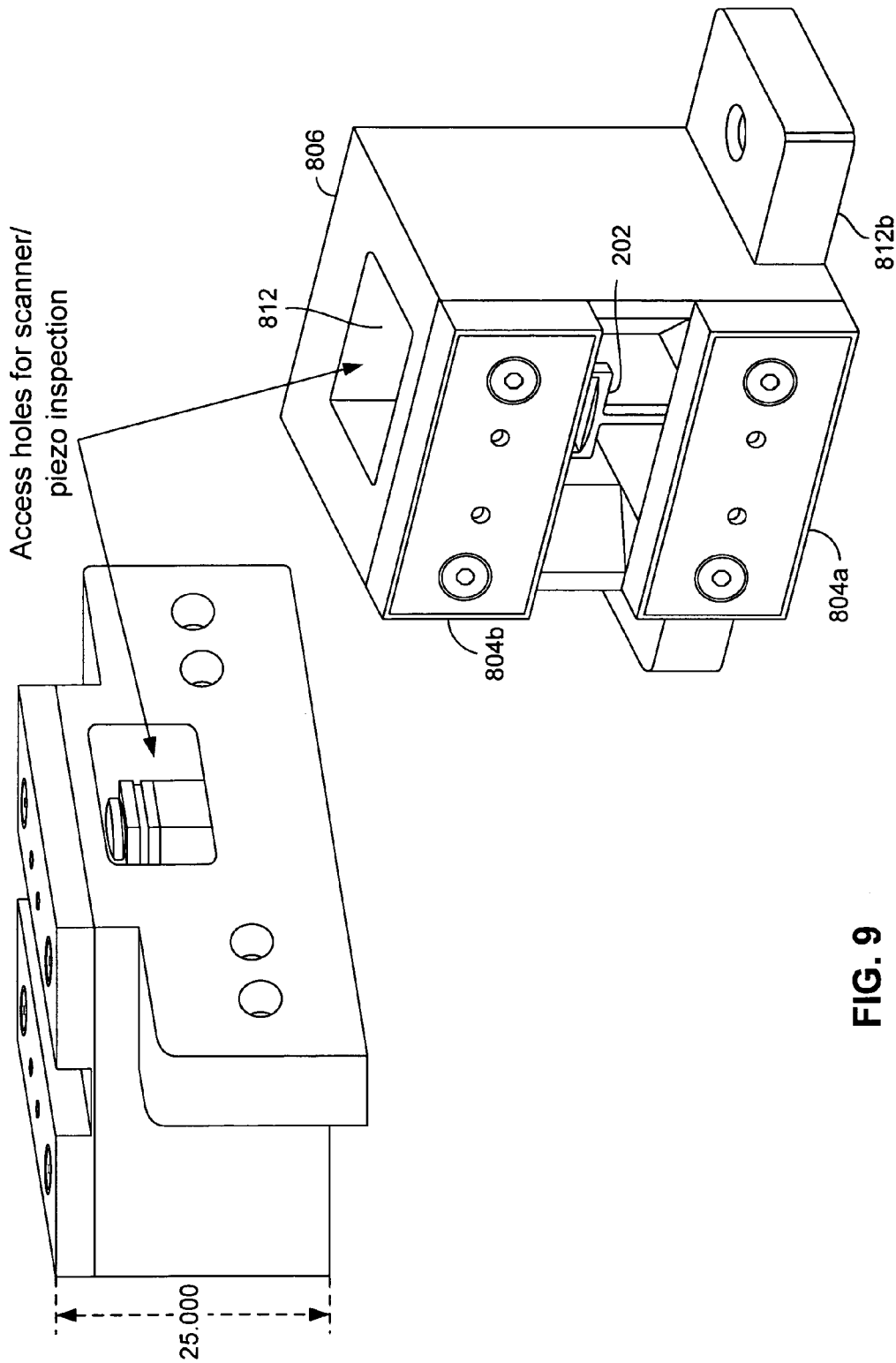
FIG. 9 includes two additional perspective views of the MEMS scanner package of FIG. 8.

FIGS. 8 and 9 are views of a MEMS scanner housing 802 for use in a LBP, bar code scanner, LIDAR, scanned laser level, etc. Two front plates 804a, 804b are fastened to a rear housing 806 with mounting screws 808a, 808b, 808c, 808d. MEMS scanner 202 is held in a cavity therein that allows for an appropriate amount of rotation. Threaded adjustment screw holes 810a, 810b, 810c, and 810d receive adjustment screws (not shown) that protrude into corresponding adjustment screw receiving bores 620 (shown in FIG. 6). During assembly, adjustment screws are turned to provide an appropriate amount of preload on series disk spring 612 (not shown). Behavior of the MEMS scanner under actuation can be observed through MEMS observation port 812, formed in the top of rear housing 806. The MEMS scanner assembly 802 is secured to the exposure unit of a LBP via mounting tabs 814a, 814b formed in housing 806.

The use of clamps 608 to secure the MEMS scanner 202 in housing 802 results in a mount that "floats", allowing the mounting pads 314 to move a bit with respect to one another. In some embodiments, slight twisting of the clamps 608 during assembly can result in slight in-plane twisting of the mounting pads 214. This can result in undesirable residual stress in the leverage members and/or torsion bars of the MEMS scanner. Such twisting may be reduced or eliminated by running or "burning-in" the mounted scanner for a few hours at reduced scan angle. In an exemplary embodiment, the scanner is run at half amplitude for approximately four hours. The burn-in process can reduce the occurrence of "infant" failures associated with mechanical failure of the leverage members and/or torsion arms. Alternative, reduced twist clamp assembly designs may be substituted to reduce or eliminate the need for scanner assembly burn-in.

The MEMS scanner 202 may be driven by four piezo-electric stacks 602, one subjacent each mounting pad 314a, 314b, 314c, and 314d. Alternatively, one end of the MEMS scanner may be held in a fixed position, i.e. mounting pads 214c and 214d may be clamped against a solid mounting point, and the other end of the MEMS scanner may be driven by piezo-electric actuators, i.e. mounting pads 214a and 214b may each be clamped against piezo-electric stacks as shown in FIG. 6. In a third alternative, three of the mounting pads are clamped to a fixed, solid mounting point and one piezo-electric stack actuator is used. Typically, the choice hinges on cost vs. actuator power requirements. As may be appreciated, similar considerations apply to a MEMS scanner design 202 such as are presented in FIG. 2B or 3.

As indicated above, the MEMS scanner is trimmed to have a resonant frequency within a few hertz of the desired operational frequency. As may be appreciated from curve 402 of FIG. 4, small changes in resonant frequency can result in relatively substantial changes in rotation amplitude (for a given periodic actuation voltage). The inventors have discovered that controlled heating of the MEMS device further trims the resonance frequency, and hence the actuation amplitude, even though in the exemplary embodiment the MEMS scanner has no outer frame. Referring back to FIG. 6, the extended tab on the first pressure plate 610 of clamp 608a receives a heater wire as does the corresponding pressure plate of clamp 608b (not shown). Similarly, corresponding pressure plates adjacent mounting pads 214c and 214d (also not shown) also receive heater wires. The heater wires may be attached by soldering to the gold plated extended tab of first pressure plate 610, by soldering to metallized silicon bond pad formed, for example on the mounting pads 214, or by other method as will be apparent to those skilled in the art.

When both mounting pads or clamps at one end of the MEMS scanner have a heater lead attached, it is preferable to hold such neighboring leads at the same electrical potential to avoid current flow therebetween. In contrast, the heater lead or leads at the opposite end of the MEMS scanner may be driven to a different voltage to create current flow along and through the torsion arms.

In use, the scan amplitude is monitored by sensors and the electric potential between the two ends of scanner 202 (mounting pads 214a and 214b forming one such end and mounting pads 214c and 214d forming the other end) is adjusted. Resistance of the silicon material itself and the doped channel described above to current flow, and particularly the torsion arms 206a, 206b, causes heating. Higher temperatures cause a "softening" of the torsion arms and a corresponding reduction in resonant frequency. Thus, when the resonant frequency is above the periodic drive signal frequency, heating may be increased to raise the temperature of the MEMS scanner, thereby trimming the resonant frequency to match the drive signal frequency. Similarly, when the resonant frequency of the MEMS scanner falls to be below the drive signal frequency, heating may be reduced, thus cooling the device and raising its resonant frequency to match the drive signal frequency. In alternative embodiments, thermal trimming may be used to change the scan amplitude even when, for a given system design, the scanner is not operated precisely at its resonant frequency.

It has been experimentally determined that 0 to 1.5 W of tuning power can provide a resonant frequency tuning range of about 8 Hz. This range may be somewhat lower at higher scanning frequencies and somewhat higher at lower scanning frequencies, presumably as a result of airflow over the scanner providing cooling during operation.

Figure 10:
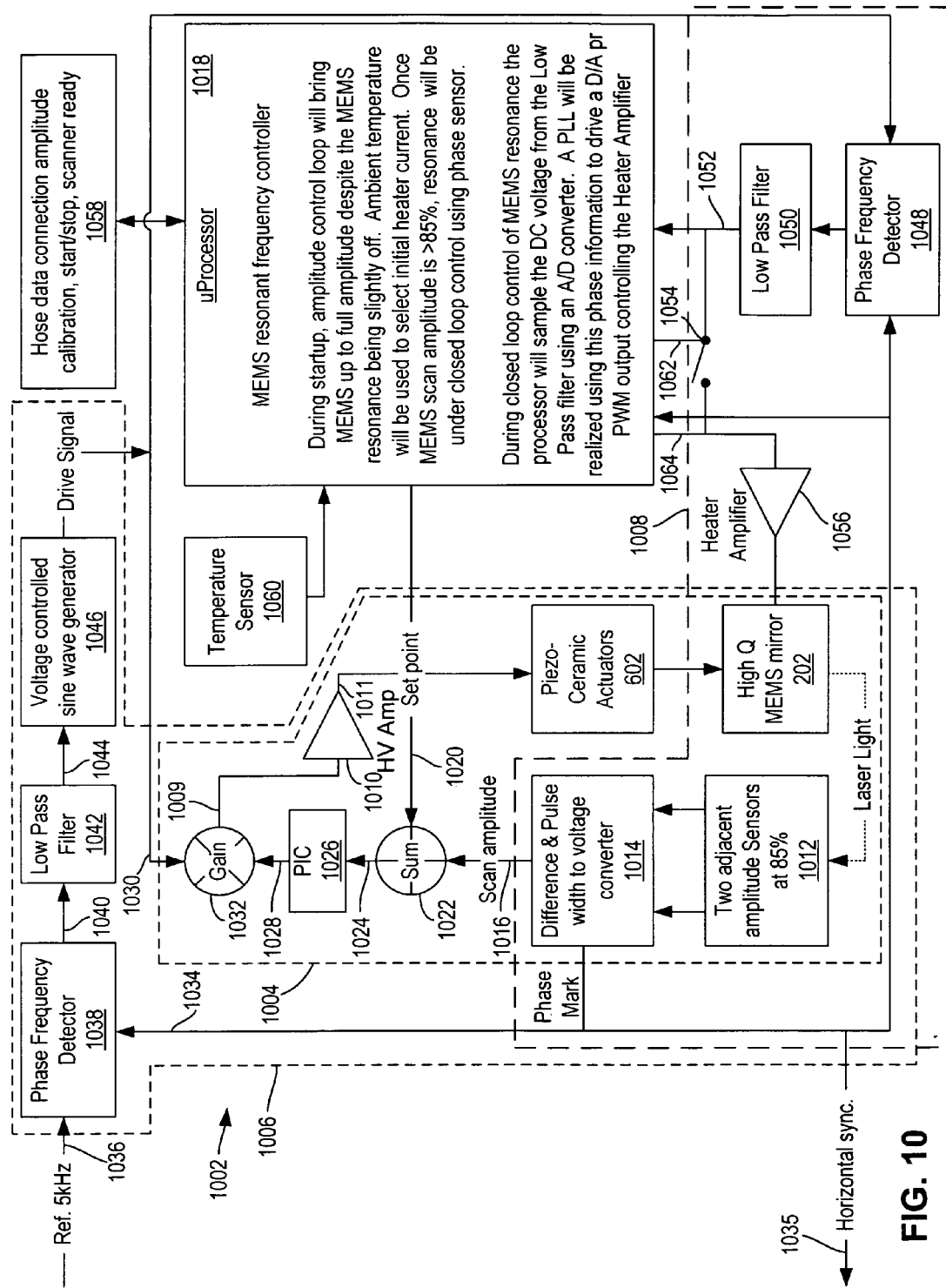
FIG. 10 is a block diagram of a control system for driving a MEMS scanner.

Turning now to FIG. 10, a block diagram showing a control system 1002 for driving a MEMS scanner is shown. For many applications, it is advantageous to precisely control the phase and amplitude of scanning of a MEMS scanner. Scanned beam applications including bar code scanners, laser cameras, scanned beam displays, electrophotographic printers and others, can benefit from precise control of MEMS scanner phase and/or amplitude.

Similarly, precise control of scanner resonant frequency can minimize power consumption, and perhaps even make feasible certain applications, by allowing operation of the scanner at its resonant frequency, rather than somewhat off resonance as has heretofore been typical practice.

The block diagram of a control system 1002 of FIG. 10 includes three overlapping servo loops for driving and controlling a MEMS scanner; an amplitude control servo loop 1004, a phase control servo loop 1006, and a resonance frequency control servo loop 1008, outlined by respective medium, short, and long dashed lines as indicated.

Turning first to the amplitude control loop 1004, low voltage drive signal 1009 is amplified by a high voltage amplifier 1010 produces a periodic high voltage drive signal 1011 that drives one or more actuators, in the form of piezo-electric driver stacks 602, to induce periodic oscillations in a resonant MEMS scan mirror 202. As will be appreciated, alternative actuator technologies, such as magnetic, electrostatic, thermal, and other types of actuators could be substituted for piezo-electric actuators 602.

A variety of technologies can be used to monitor the phase, amplitude, position, and/or speed of MEMS scan mirror 202. In the exemplary embodiment, the light beam deflected by the mirror includes approximately 20% overscan, the edge of the imaging region thus ending at 80% scan. An optical detector 1012, comprising a pair of adjacent sensor areas is positioned with its center point (the center of the region between the sensor areas) at 85% of the scan range. The output from one sensor area is subtracted from the output of the other sensor area by converter 1014. Converter 1014 is a difference and pulse-width-to-voltage converter that outputs a negative voltage proportional to the amount of time the beam is beyond the central 85% of scan range as scan amplitude signal 1016.

A microprocessor 1018 sets an amplitude set point voltage signal 1020 that is added to scan amplitude signal 1016 in adder 1022, to produce raw amplitude error signal 1024. Thus, if the scan amplitude is greater than desired, the absolute magnitude of the negative scan amplitude signal 1016 will be greater than the absolute magnitude of the set point signal 1020, and the raw amplitude error signal 1024 will be a negative number. Conversely, if the scan amplitude is less than desired, the absolute magnitude of the negative scan amplitude signal 1016 will be less than the absolute magnitude of the set point signal 1020, and the raw amplitude error signal 1024 will be a positive number.

Raw amplitude error signal 1024 is fed to proportional integral controller (PIC) 1026. PIC 1026 produces conditioned amplitude error signal 1028. PIC 1026 acts to dampen the system response to fluctuations in scan amplitude. It averages variations in raw amplitude error signal 1024 voltages and acts to control the rate at which changes in amplitude error are fed back to affect the high voltage drive signal, thereby improving stability and performance of the amplitude control servo loop 1004.

Raw drive signal 1030 aperiodic, low voltage signal that is the nominal phase-corrected signal for driving the MEMS scanner. Raw drive signal 1030 is received and is multiplied by gain circuit 1032 to produce low voltage drive signal 1009. Thus, if the amplitude of the MEMS scanner 202 is measured to be too low, conditioned amplitude error signal 1028 is a relatively high voltage that, when multiplied by raw drive signal 1030 in gain circuit 1032 produces a relatively large amplitude low voltage drive signal 1009. If the amplitude of the MEMS scanner is measured to be too high, conditioned amplitude error signal 1028 is a relatively low voltage that, when multiplied by raw drive signal 1030 in gain circuit 1032 produces a relatively low amplitude low voltage drive signal 1009. Either case thereby serves to bring the scan amplitude back to a desired value set by the microprocessor 1018 as set point voltage signal 1020.

Phase control servo loop 1006 operates as a phase locked loop. Converter 1014, described above in conjunction with amplitude control servo loop 1004, produces phase mark signal 1034 that is also passed back to the host controller as horizontal synchronization signal 1035. Phase mark signal 1034 is generated from the subtracted detector pair signals using one edge, i.e. one scan direction. Like edges of reference signal 1036 and phase mark signal 1034 are compared by first phase frequency detector 1038. First phase frequency detector 1038 produces periodic spikes on raw phase error signal 1040, the width of the spikes being proportional to phase error, and the sign of the spikes indicating whether the phase mark signal 1034 is early or late with respect to reference signal 1036.

First low pass filter 1042 converts the periodic spikes on raw phase error signal 1040 to a dc voltage as first conditioned phase error signal 1044. First low pass filter 1042 sets first conditioned phase error signal 1044 to a relatively low value if the phase mark 1034 is early relative to reference signal 1036. Conversely, first low pass filter 1042 sets first conditioned phase error signal 1044 to a relatively high value if the phase mark 1034 is late relative to reference signal 1036.

First conditioned phase error signal 1044 is passed to a voltage controlled drive waveform generator 1046. The voltage of first conditioned phase error signal 1044 determines the frequency of the raw drive signal 1030 output by the voltage controlled drive waveform generator 1046.

Thus, if a phase mark signal 1034 is early relative to reference signal 1036, the first phase frequency detector 1038 outputs a negative spike on raw phase error signal 1040, the width of the spike being proportional to the magnitude of the error between the phase mark signal 1034 and the reference signal 1036; a series of negative spikes on raw phase error signal 1040 drives first low pass filter 1042 to output a relatively low voltage on first conditioned phase error signal 1044, the voltage being moderately low if the spike widths on raw phase error signal 1040 are narrow and the voltage being more extreme (lower) if the spike widths are wider; a low voltage on first conditioned phase error signal 1044 causes voltage controlled drive waveform generator 1046 to output a lower frequency raw drive signal 1030, small deviations in phase (moderately low voltage on first conditioned phase error signal 1044) causing moderate decreases in frequency and relatively larger deviations in phase (lower voltage on first conditioned phase error signal 1044) causing larger decreases in frequency; the lower frequency serves to retard the phase of the MEMS mirror, causing phase mark signal 1034 to be output somewhat later, thereby bringing phase mark signal 1034 back into synchronicity with reference signal 1036, and causing a phase lock to reference signal 1036.

If phase mark signal 1034 is late relative to reference signal 1036, the voltage of first conditioned phase error signal 1044 is increased, causing the drive frequency of raw drive signal 1030 to increase, and similarly bringing the phase mark signal 1034 back into synchronicity with reference signal 1036. The time constant of low pass filter 1042 serves to provide damping to the phase servo control system 1006.

Referring now to resonant frequency servo control loop 1008, the relative phases of the drive signal and the scanner response are used to adjust MEMS scanner resonant frequency. As was described above in conjunction with FIG. 4, the MEMS scanner response phase varies with respect to drive phase with frequency as illustrated by curve 408. At the primary spike in scanner amplitude response curve 402, the phase relationship between the drive signal and the scanner response rapidly inverts from in-phase (0°) below the primary resonant peak to −180° out of phase above the primary resonant peak, passing through −90° at the primary resonant peak. Resonant frequency servo control loop 1008 makes use of this change in phase response to keep the resonant response of the MEMS scanner tuned to match the drive frequency.

At its primary peak in resonant response, the MEMS device phase response to a drive signal rapidly shifts from 0° to −180°, passing through −90° at its resonance peak. While this inversion is shown as substantially instantaneous in FIG. 4 (owing to the broad frequency range of the chart), the inversion actually takes place over a few Hertz. Thus, it is desirable to maintain the phase offset between the phase mark signal 1034 and the drive signal 1030 at −90°, indicating operation of the MEMS scanner at its resonance peak.

According to an exemplary embodiment, the temperature dependence of the MEMS scanner resonant frequency is used to advantage. The phase mark signal 1034 is compared to raw drive signal 1030 by second phase frequency detector 1048, which cooperates with second low pass filter 1050 to produce a second conditioned phase error signal 1052. Second phase frequency detector 1048 is set to output a nominal voltage on second conditioned phase error signal when the phase offset between the phase mark signal 1034 and the drive signal 1030 is −90°, increasing the voltage when the relative phase is between −90° and −180°, and decreasing the voltage when the relative phase is between 0° and −90°. The nominal voltage is that voltage appropriate for setting current through the MEMS scanner 202 to make the resonant frequency match the drive frequency. According to an exemplary embodiment and as described above, the MEMS scanner is trimmed during manufacturing to have a primary resonance peak a few hertz above the nominal operating frequency at room temperature. Current is then supplied by the resonance frequency servo control loop 1008 to reduce the resonance frequency of the MEMS scanner 202 to match the drive frequency 1030 as shown.

Switch 1054 is normally closed when the system is in operation (after start-up). Thus the voltage on second conditioned phase error signal 1052 is passed to heater amplifier 1056. When the relative phase between the phase mark signal 1034 and drive signal 1030 is between −90° and −180°, second phase frequency detector 1048 and second low pass filter 1050 cooperate to raise the voltage on second conditioned phase error signal 1052 proportionally to the degree of deviation from −90°. Heater amplifier 1056 is thus driven to set a voltage across MEMS mirror 202 when the phase of the mirror response lags behind the phase of the drive. Such a condition corresponds to the resonant peak of the mirror being higher than the drive frequency.

As was described above, increasing the electrical potential across the semiconductive MEMS scanner 202 leads to increased joule heating within the scanner, thus raising its temperature. Raising the temperature of the MEMS scanner 202 lowers its peak resonance frequency. Thus, when the peak resonance frequency of the MEMS scanner 202 is above the drive signal frequency, its phase tends to lag the phase of the drive signal by somewhat less than 90°, and the resonant frequency servo control loop 1008 causes an increase in temperature of the scanner, bringing the phase difference into the appropriate relationship, and thereby reducing the peak resonance frequency of the MEMS scanner 202 to match the drive signal frequency. Conversely, if the MEMS scanner 202 is heated sufficiently to lower its peak resonance frequency below the drive frequency, its phase tends to lag the drive signal by somewhat more than 90°, and the control loop reduces heater current flow, thus raising the peak resonance frequency a little to make it match the drive frequency until the phase relationship is again −90°. This control loop allows the scanner to be operated substantially at its peak resonant frequency and thus minimizes actuator power requirements.

Returning to FIG. 10, microprocessor 1018 includes communication provision 1058 and includes an ambient temperature sensor 1060. It can also be seen that second conditioned phase error signal 1052 and phase mark signal 1034 are sent to microprocessor 1018 and that control lines 1062 and 1064 connect respectively with switch 1054 and heater amplifier 1056. Many or all of these features are used during system start-up.

Figure 11:
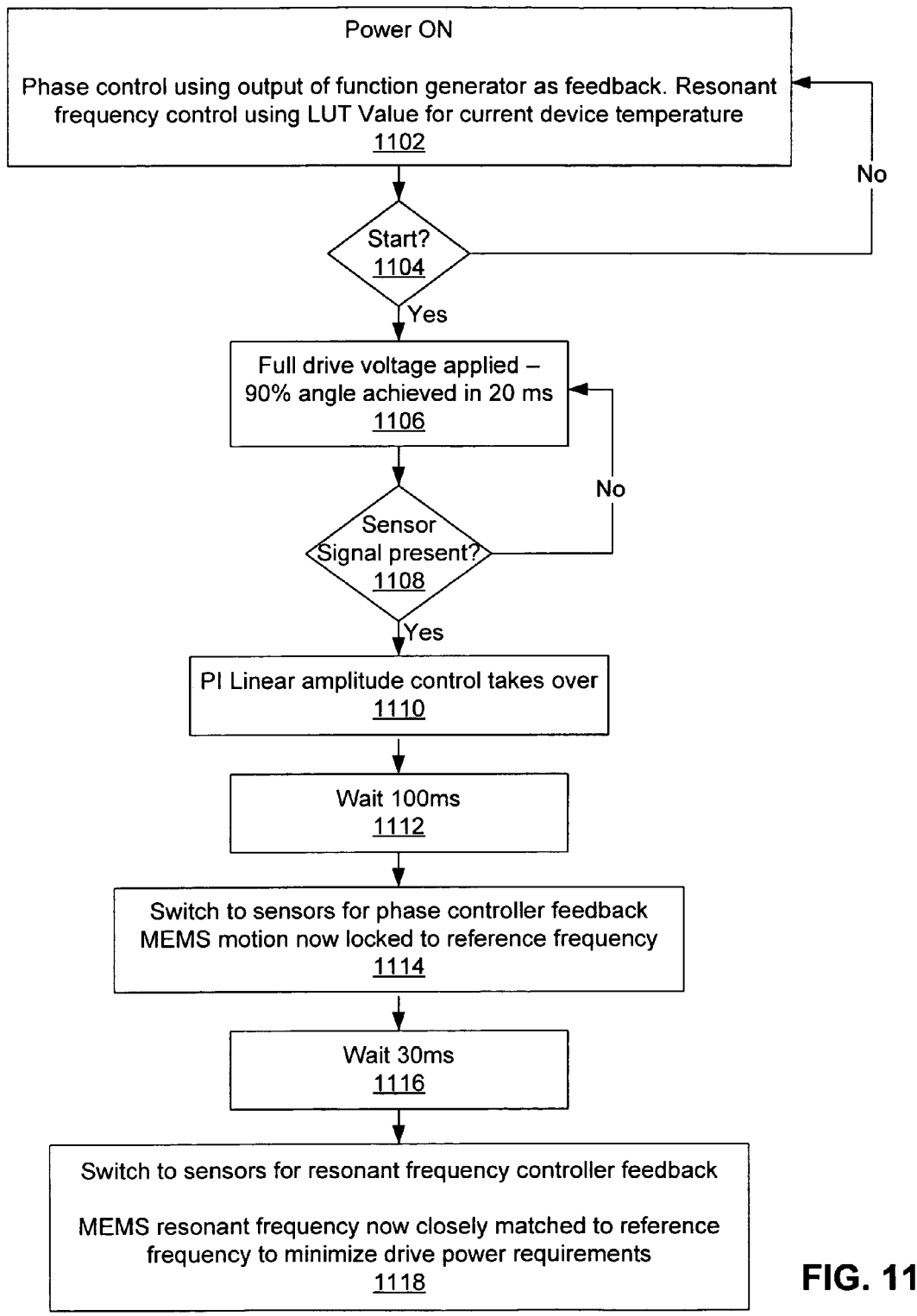
FIG. 11 is a flow chart showing a start-up method for driving a MEMS scanner.

FIG. 11 is a flow chart showing a start-up method used by the system 1002 shown in FIG. 10. When power is on during an idle state corresponding to process 1102, the phase control loop 1006 and resonant frequency control loop 1008 are both run using simulated feedback. The microprocessor 1018 first sets a voltage on line 1044 that is sent to the voltage controlled waveform generator 1046. The raw drive signal line 1032 then serves as input to a converter (not shown) that outputs a simulated phase mark signal 1034 to the first phase frequency detector 1038. The first phase frequency detector 1038 then compares the simulated phase mark signal 1034 to the reference signal 1036, outputting a raw phase error signal 1040 to first low pass filter 1042 that, in turn, sets a voltage on conditioned phase error signal 1044. Thus the phase servo control loop 1006 continues to run independent of MEMS scanner movement and detection.

To run the resonant frequency servo control loop 1008, the microprocessor 1018 reads an ambient temperature from ambient temperature sensor 1060. The temperature sensor value is converted to a digital value that serves as an index to a resonant frequency look-up table (LUT) (not shown). The resultant resonant frequency LUT value drives a digital-to-analog converter (DAC) that outputs a synthesized resonant frequency voltage signal 1064 to drive heater amplifier 1056. As during operation, heater amplifier 1056 then sets a voltage across the MEMS scanner 202 and joule heating raises the temperature of the MEMS scanner to a temperature corresponding to the resonant frequency LUT value. In some embodiments, the resonant frequency LUT is derived for each MEMS scanner 202 as a factory calibration step by determining the scanner temperature necessary to trim its resonant frequency to a target operating frequency, for example 5 KHz. In other embodiments, the LUT can be set for a batch of MEMS scanners or for all MEMS scanners. Thus, during the idle state corresponding to process 1102, the resonant frequency servo control loop 1008 is operative to keep MEMS scanner 202 at a nominal operating temperature set to match its resonant frequency to the reference signal 1036 frequency.

As an alternative to sensing ambient temperature, temperature sensor 1060 may be thermally coupled to MEMS scanner 202 and measure its temperature.

While in the power-on idle process 1102, the microprocessor 1018 checks to determine if a start signal is received from the host controller over interface 1058, as indicated by conditional step 1104. As indicated by the "NO" decision, power-on idle process 1102 continues until a start signal is received from the host controller. When a start signal is received, the embedded software proceeds to start-up amplitude control process 1106. Upon entering start-up amplitude control process 1106, microprocessor 1018 sets low voltage drive signal 1009 to drive high voltage amplifier 1010 to produce high voltage drive signal 1011 at a maximum amplitude, thus overdriving the piezo-electric stack actuators 602. Overdriving piezo-electric stack actuators 602 results in very rapid ramp-up of scan amplitude. According to one start-up embodiment, high voltage drive signal 1011 comprises a sine wave at the reference 5 KHz frequency with an amplitude of 0 (zero) to 60 volts. In this embodiment the MEMS scanner is driven to reach approximately 90% of its nominal scan angle in only 20 milliseconds, resulting in faster system start-up than would result from applying the lower nominal steady-state drive voltage of about 0 to 20 volts.

In other embodiments, the high voltage drive signal may be set with even greater amplitude, up to near the dielectric breakdown voltage of the actuators 602. High start-up drive voltages are possible because they are only applied for a relatively short time; too short to exceed the thermal limitations of the actuators.

While in start-up amplitude control process 1106, the system looks for a stable phase mark signal 1034, as indicated by decision process 1108. A stable phase mark signal is determined by monitoring a circuit (not shown) that averages several successive phase marks to determine that they meet amplitude control servo loop 1004 requirements. Once a stable phase mark signal is present, meaning that the MEMS scanner 202 is operating at a relatively constant frequency and with sufficient amplitude that the scanned beam crosses the optical amplitude sensors 1012, the process moves to closed loop amplitude control process 1110, where scanner amplitude is controlled by the amplitude control servo loop 1004. Upon entering closed loop amplitude control process 1110, the PIC 1026 introduces changes to the drive amplitude at a rate consistent with stable operation, as discussed above.

Closed loop amplitude control process 1110 continues while the system waits to ensure system stabilization, indicated by the "wait" process 1112. According to one embodiment, the system waits 100 milliseconds before proceeding to closed loop phase control process 1114, wherein phase mark signal 1034 (produced by converter 1014) is coupled to first phase frequency detector 1038 and the synthesized phase mark signal generated from raw drive signal 1030 is decoupled). Process 1114 locks the MEMS scanner 202 frequency to the reference signal 1036 frequency, thus engaging phase control servo loop 1006 as a phase locked loop, as described above.

While closed loop phase control process 1114 proceeds, the system pauses for a time, for example 30 milliseconds, as indicated by process 1116. After wait process 1116 is completed, the system enters closed loop resonant frequency control process 1118, wherein resonant frequency servo loop 1008 is engaged. Resonant frequency servo loop 1008 is engaged by closing switch 1062 and substantially simultaneously ceasing the output of DAC signal 1064 from the microprocessor 1018. This causes second conditioned phase error signal 1052 to drive heater amplifier 1056 according to the method described above in conjunction with FIG. 10.

According to an exemplary embodiment, the start-up process of FIG. 11 generally results in stable operation of the scanning system within less than two seconds after receiving a start-up command from the host controller.

The preceding overview of the invention, brief description of the drawings, and detailed description describe exemplary embodiments according to the present invention in a manner intended to foster ease of understanding by the reader. Other structures, methods, and equivalents may be within the scope of the invention. As such, the scope of the invention described herein shall be limited only by the claims.

What is claimed is:

1. A method for manufacturing semiconductor devices; comprising:
    deep etching outlines of a plurality of interdigitated shapes in a semiconductor wafer, the interdigitated shapes comprising a MEMS device having a first resonant frequency during operation;
    doping the semiconductor wafer with phosphorus to allow a conduit for joule heating of the semiconductor wafer to cause the MEMS device to have a second resonant frequency in response to the joule heating; and
    removing the plurality of interdigitated shapes from the semiconductor wafer to produce a plurality of semiconductor devices having irregular outlines.

2. The method for manufacturing semiconductor devices of claim 1; wherein the pattern of outlines of the plurality of interdigitated shapes corresponds to the pattern of a photo-mask.

3. The method for manufacturing semiconductor devices of claim 2; further comprising:
    applying a photo-resist to the semiconductor wafer;
    selectively exposing the photo-resist using the photo-mask, the photo-mask having a plurality of interdigitated shapes formed thereon; and
    selectively removing photo-mask material from the semiconductor wafer.

4. The method for manufacturing semiconductor devices of claim 1; wherein the semiconductor devices are MEMS scanners.

5. The method for manufacturing semiconductor devices of claim 4; wherein each MEMS scanner is formed with a substantially constant thickness, substantially equal to the thickness of the semiconductor wafer.

6. The method for manufacturing semiconductor devices of claim 1; wherein the semiconductor devices are removed from the wafer without dicing the wafer.

7. The method for manufacturing semiconductor devices of claim 1; wherein the etched outlines of the plurality of interdigitated shapes each includes a plurality of semiconductor bridges thereacross.

8. The method for manufacturing semiconductor devices of claim 7; wherein removing the plurality of interdigitated shapes from the semiconductor wafer to produce a plurality of semiconductor devices having irregular outlines includes cracking the bridges.

9. The method for manufacturing semiconductor devices of claim 1; wherein deep etching outlines of a plurality of interdigitated shapes in a semiconductor wafer includes deep reactive ion etching.

10. The method for manufacturing semiconductor devices of claim 1; wherein deep etching outlines of a plurality of interdigitated shapes in a semiconductor wafer includes etching completely through the semiconductor wafer.

11. A method for fabricating a MEMS semiconductor, comprising:
    etching outlines of a plurality of interdigitated shapes in a semiconductor wafer to form a MEMS device having a first resonant frequency during operation;
    doping the semiconductor wafer with phosphorus to allow a conduit for joule heating of the semiconductor wafer to cause the MEMS device to have a second resonant frequency in response to the joule heating; and
    removing the plurality of interdigitated shapes from the semiconductor wafer to produce a plurality of semiconductor devices having irregular outlines.

12. A method as claimed in claim 11, wherein said doping is performed to a depth of about 0.5 microns.

13. A method as claimed in claim 11, said doping comprising doping to a concentration of about $1 \times 10^{20}$ phosphorus 31 atoms/cm$^3$.

* * * * *